UNITED STATES PATENT OFFICE.

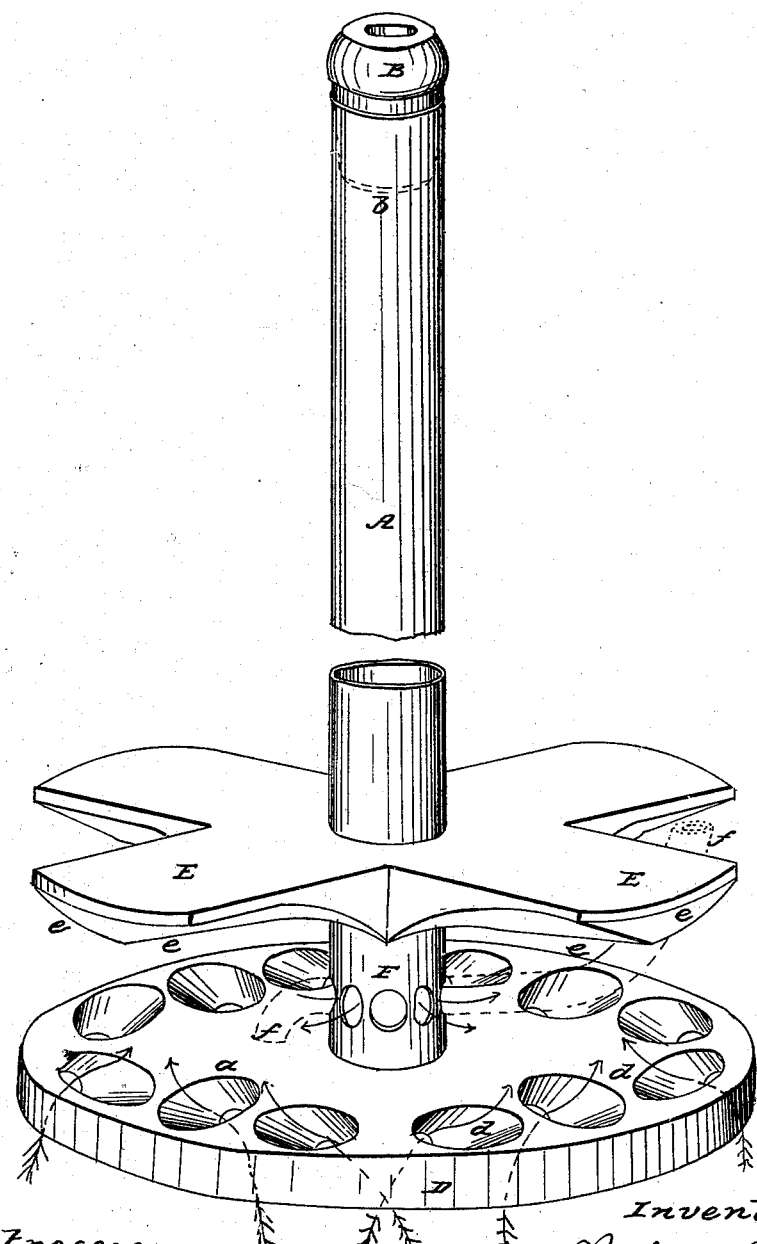

JOHN GELSTON, OF CINCINNATI, OHIO.

IMPROVEMENT IN CHURN-DASHERS.

Specification forming part of Letters Patent No. 54,891, dated May 22, 1866.

*To all whom it may concern:*

Be it known that I, JOHN GELSTON, of Cincinnati, Hamilton county, and State of Ohio, have invented certain new and useful Improvements in Churn-Dashers; and I do hereby declare the following to be a full, clear, and exact description thereof, reference being had to the accompanying drawing, making part of this specification.

My invention relates to a new, simple, and reliable method of forcing air into the cream in the act of churning, and which, in connection with an improved form of dasher for increasing the agitation, is believed to produce a superior quality of butter in less time than by any of the numerous styles of dashers now in use.

In the accompanying drawing, which is a perspective view of a churn-dasher embodying my improvements, A represents a tubular handle, which may be constructed of wood, sheet metal, or any other suitable material. The upper end of said tubular handle is provided with a longitudinally-perforated plug, B, said plug having attached to its lower end a downwardly-opening valve, $b$, for the admission of air into the handle, for a purpose which will be hereinafter described, while the extreme lower end of the handle A is permanently closed by a cap or plug.

The dash proper is composed of a disk, D, provided with numerous apertures, $d$, which may be bored vertically through said dash or at any suitable angle therewith.

Attached to the handle A at a slight distance above the dash are a series of arms, E, which may be more or less in number according to the size and capacity of the churn. The sides of these arms, instead of being vertical, are undercut, so as to form deflecting-faces $e$.

F F, &c., are a series of apertures pierced through the sides of the tubular handle A, and said apertures are located between the dash D and arms E; but when the dash D alone is used I prefer that the apertures should be above said dash. These apertures may be few in number, with a somewhat large area; or, if preferred, the area of said apertures may be diminished and the numbers increased.

An inferior though somewhat more expensive modification may consist in attaching tubes to the apertures F, and said tubes may have either an upward or downward inclination, as shown by dotted lines at $f$.

Operation: As this dasher is to be used in churns having a straight cylindrical barrel, or nearly so, it is evident that the dash D, fitting snugly in the churn, will act as a piston or plunger, and as the handle is elevated the cream will escape down through the apertures $d$. This upward motion of the handle A rarefies the atmosphere contained in it, which causes the valve $b$ to open and admits a sufficient quantity of air to fill the tubular handle. On the downward stroke of the dasher the air cannot escape from the tubular handle through the valve $b$, and it is therefore ejected through the apertures F into the cream, causing the latter to strike against the sides of the churn with great force, and the same downward stroke also drives the cream up through the apertures $d$ against the deflecting-faces $e$ of the arms E, thus producing the most thorough and complete agitation of the cream. As the dasher is again elevated the air which had been forced into the cream by the previous downward stroke now ascends through the entire body of the cream in the shape of minute air-bubbles, which also serve to increase the agitation of the cream.

I am aware that the tubular handle has been employed for forcing air into the cream in the act of churning, and therefore do not desire to claim that device broadly; but What I do claim herein as new and of my invention is—

1. The provision, in the tubular handle of a churn-dasher, of the apertures F, for passing compressed air through the body of the cream at right angles to said tubular handle, substantially as described, and for the purpose set forth.

2. The arms E, when provided with deflecting-faces $e$, in combination with the perforated dash D, all arranged to operate substantially as and for the purpose herein described.

In testimony of which invention I hereunto set my hand.

JOHN GELSTON.

Witnesses:
GEO. H. KNIGHT,
JAMES H. LAYMAN.